United States Patent [19]

Canfield

[11] Patent Number: 5,754,653
[45] Date of Patent: May 19, 1998

[54] CODING FORMULA FOR VERIFYING CHECKS AND CREDIT CARDS

[76] Inventor: Henry A. Canfield, 67 Wind Whisper Ct., The Woodlands, Tex. 77380

[21] Appl. No.: 506,781

[22] Filed: Jul. 26, 1995

[51] Int. Cl.[6] .................................................. H04L 4/00
[52] U.S. Cl. .................................................. 380/24; 380/59
[58] Field of Search .................... 380/24, 59; 235/380, 235/379; 340/825.34; 283/58

[56] References Cited

U.S. PATENT DOCUMENTS

| | | | |
|---|---|---|---|
| Re. 31,302 | 7/1983 | Stambler | 340/825.34 |
| 3,786,420 | 1/1974 | Stambler | 340/825.34 |
| 3,829,133 | 8/1974 | Smagala-Romanoff | 283/58 |
| 4,184,148 | 1/1980 | Smagala-Roman | 340/149 A |
| 4,445,712 | 5/1984 | Smagala-Roman | 283/75 |
| 4,562,342 | 12/1985 | Solo | 235/380 |
| 4,614,861 | 9/1986 | Pavlov et al. | 235/379 |
| 4,630,201 | 12/1986 | White | 235/379 |
| 4,670,644 | 6/1987 | Grayson | 235/487 |
| 5,130,519 | 7/1992 | Bush et al. | 380/24 |
| 5,267,314 | 11/1993 | Stambler | 380/24 |
| 5,341,428 | 8/1994 | Schatz | 380/24 |
| 5,432,506 | 7/1995 | Chapman | 235/379 |
| 5,524,073 | 6/1996 | Stambler | 380/24 |
| 5,555,303 | 9/1996 | Stambler | 380/24 |

OTHER PUBLICATIONS

Patent Application filed by Canfield Serial No. 08/285,503, filed Aug. 3, 1994.

*Primary Examiner*—Salvatore Cangialosi
*Attorney, Agent, or Firm*—Mary J. Gaskin

[57] ABSTRACT

A method is disclosed for verifying that a check user, a credit card holder, or an account user is authorized to complete a transaction. The issuer of the check or credit card or the verifying entity assigns a security code formula to each user, consisting of two variables: a base code number separated into two parts; and one or more arithmetic modes. The authorized user will calculate a verification code number in a two step process using the two parts of the base code and the check number or transaction amount; he then places it on the check or the transaction slip. Verification can be performed by the issuer, who ensures that a correct verification code number has been entered on the check or transaction slip.

10 Claims, 8 Drawing Sheets

| QUAN | CLASS | DESCRIPTION | AMOUNT | |
|------|-------|-------------|--------|--|
|      |       |             |        |  |
|      |       |             |        |  |
|      |       |             |        |  |
|      |       |             |        |  |
| DATE |       | SUBTOTAL    |        |  |
|      |       | TAX         |        |  |
|      |       | TOTAL       |        |  |

Customer Signature: X _____

VISA CARD
John James Jones
984 6272 5100

4 8 4 2 3 0 7 6

| QUAN | CLASS | DESCRIPTION | AMOUNT | |
|------|-------|-------------|--------|--|
| 1    |       | Jacket      | 69     | 95 |
|      |       |             |        |  |
|      |       |             |        |  |
|      |       |             |        |  |
| DATE |       | SUBTOTAL    | 69     | 95 |
| 3/5/94 |     | TAX         | 5      | 59 |
|      |       | TOTAL       | 75     | 54 |

Customer Signature: X John James Jones

ANY ONE STORES
One Park Place
Houston, Texas

2967

_____ 19 ____

Pay to the Order of _____ $ _____

_____ Dollars

51 — ▢▢▢▢▢▢▢▢
52 — ▢▢▢▢▢▢▢▢

For _____        2967    32105    647   261

FIG. 8

ANY ONE STORES
One Park Place
Houston, Texas

2967

_July 10_ 19 _95_

Pay to the Order of _John James Jones_  $ _947.65_

_Nine Hundred Forty Seven Dollars and 65/00_ . . . . . Dollars

51 — 55⌒  56⌒
     | 4 | 6 | 2 | 8 | 5 | 2 | 4 | 3 |
52 — ▢▢▢▢▢▢▢▢

*Mark One Price*

For _Pension Trust : 6/95_    2967    32105    647   261

FIG. 9

CODING FORMULA FOR VERIFYING CHECKS AND CREDIT CARDS

BACKGROUND OF THE INVENTION

1. Field of the Invention

This invention relates to methods for verifying the identity of the presenter of credit cards of checks, and for confirming the identity of a person in certain related circumstances.

2. Description of the Prior Art

In some respects, the present invention is related to my co-pending application for United States Letters Patent Ser. No. 08/285,503, filed Aug. 3, 1994, now abandoned.

In the past, small or moderately-sized banks served local banking needs. The advent of the computer and changes in banking laws have allowed large banking institutions to dominate the banking industry. At the same time, safeguarding depositors' accounts from forgers has become increasingly difficult in light of the quantity of checks presented on a daily basis. The required signature card is not always used to ensure that only checks with an authorized signature will be honored. Some banks may only examine the signature on checks for large amounts. The loss resulting from a bank's acceptance of checks with unauthorized signatures can fall on either the bank or the account holder, depending on U.C.C. provisions. A need exists for a system which eliminates the need for a manual examination of signatures, yet assures that only checks with authorized signatures are paid.

Credit card transactions present similar problems. Credit card fraud flourishes because security technologies have not been successful. The typical merchant accepts virtually any card presented for payment. Purchases are often made by telephone. Some transactions produce either single or multiple copies of documents reflecting the card holder's name, account number, and signature. These can be found or retrieved by a thief. Generally, the issuer bears the loss of credit card fraud unless it can show that a merchant has accepted a card after it had been reported to him as stolen, lost or overdrawn.

Prior art technologies to eliminate fraud have been expensive or unreliable. Some use expensive readers or other peripheral equipment. Other proposals have involved modifications to the credit card itself. Still others use a code of some kind. One type of code is the Personal Identification Number (PIN), which is effective for ATM usage, until it becomes known to an unauthorized user. Finger print or signature comparison systems are expensive and subject to errors of judgment.

In the co-pending application, a method was disclosed for verifying that a check user or credit card holder is authorized to complete a transaction. In that method, the issuer of the check or credit card assigns a security code formula to each user consisting of four variables: a base code number; an arithmetic mode; a transaction amount digit position; and a verification box position. The authorized user calculates a verification code number and places it on the transaction slip or check. The method, while virtually foolproof, is subject to the remote possibility that a user's security code formula might be ascertained through trial and error by a persistent, unauthorized user. Further, the security code formula of that method consists of four variables. The simplicity of using a single-digit base code requires use of two other variables (transaction amount digit position and verification box position) to thwart potential code breakers.

3. Objectives of the Present Invention

It is the general object of the present invention to provide a security code system for checks and credit cards which is convenient and reliable.

It is another object of the present invention to provide a security code system which high-speed computers can use to verify that the holder of a credit card or check is authorized to present it.

Another object of the present invention is to provide a security code system with a verification number which changes for every transaction.

Still another object of the invention is to provide a security code system which will reduce fraud and misappropriation.

Yet another object of the present invention is to provide a verification number which is easy for a credit card holder or check issuer to calculate, but impossible for an unauthorized user to ascertain.

It is a further object of the present invention to provide a security code system utilizing an easily remembered, multiple-digit base code which is manipulated with the variable transaction amount or check number to produce a unique verification code which is impossible for an unauthorized user to determine.

Yet another object of the present invention is to provide a method for confirmation of an authorized purchaser's identity when such is necessary.

SUMMARY OF THE INVENTION

The present invention achieves the above objectives by providing a method for calculating a verification code, which changes for each use of a credit card or check. The computations are most easily performed on a small, hand-held calculator.

A multiple-digit base code is assigned to each user. The base code may be composed of as few as two digits, and as many as eight digits. Typically, a user will choose an easily remembered number—a birthdate of a child, a friend's telephone number, or a portion thereof.

For a checking account user, the base code is divided into two parts (in a pre-determined manner—not necessarily into two equal parts) and each part is combined arithmetically with the number of the check being written to form a multiple-digit verification code. When the check is processed, the authenticity can be established by the entry of a correct verification code on the document. If the number is incorrect, a comparison of the signature on the check to the signature card can be made, or the check can be treated as a returned item.

When a credit card is being used, the procedure is similar. The base code is divided into two parts (in a pre-determined manner) and each part is combined arithmetically with the amount of the credit card transaction to form a multiple-digit verification code, which is entered on the transaction slip. The resulting verification code can be compared for correctness to the security code data held in the memory of the card issuer's computer, either immediately or when processed.

In both instances, the manner in which the numbers have been manipulated makes it impossible for an unauthorized person to decipher the account holder's assigned base code. While the base code and the way it is divided would stay constant, the two-step arithmetic operation (multiplication, division, or square root, or a combination of two of these) on either the check number or the transaction amount would cause the verification code to vary with each transaction.

The system can also be used to establish the identity of telephone card users, computer services users, and others.

In all cases, the use of a small hand-held calculator keeps the process fast and accurate.

Other features and objects of the invention will be more fully appreciated from the following description of the preferred embodiment taken together with the drawings.

BRIEF DESCRIPTION OF THE DRAWINGS

FIG. 6 is a front view of a credit card transaction slip.

FIG. 7 is a front view of a completed credit card transaction slip which incorporates the security code formula of the present invention.

FIG. 8 is a front view of a blank commercial check.

FIG. 9 is a front view of a completed commercial check showing the verification code of the maker.

DESCRIPTION OF PREFERRED EMBODIMENT

Figure 1:
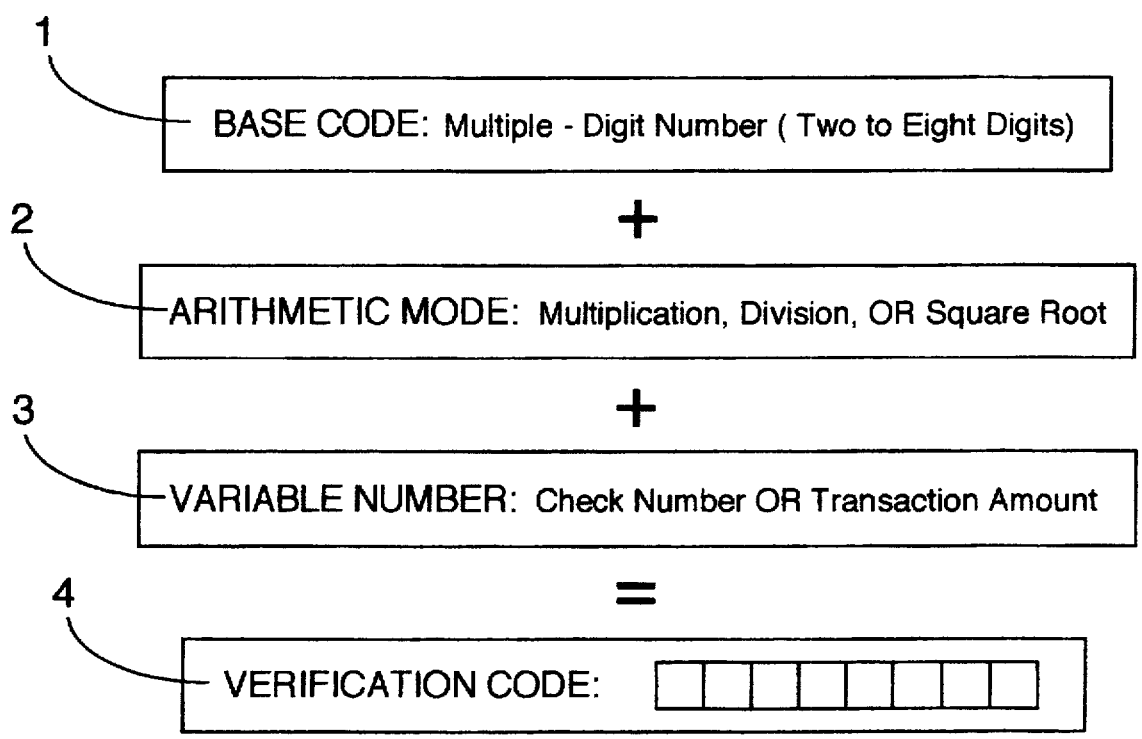
FIG. 1 is a block diagram showing the possible choices of the three variables which combine to determine the security code formula assigned to an account.

FIG. 1 illustrates the components which are used to arrive at a verification code for each transaction. The bank or credit card issuer (both referred to as "issuer") assigns a multiple-digit base code 1 to each checking or credit card account. The base code 1 can be any real number containing two, three, four, five, six, seven, or eight digits. Examples are 83, 476, or 1213. The base code 1 will be separated into two parts, in a pre-determined manner, before arithmetic operations are performed. The base code 1 is known only to the account holder (or his authorized user) and the issuer's computer.

Next, the issuer assigns an arithmetic mode 2 to each account. The arithmetic mode 2 can be multiplication, division, square root, or a combination of two of those arithmetic modes. Again, only the issuer's computer and account holder will know the assigned arithmetic mode 2 (or modes).

Finally, each transaction will utilize a variable number 3. For a transaction involving a check, the variable number 3 is the check number which is preprinted on the check. For a credit card transaction, the variable number 3 will be the actual total transaction amount. The user will manipulate the assigned base code 1 and the variable number 3, using the assigned arithmetic mode 2 (or modes), in order to find the verification code 4 for a particular transaction.

Figure 2:
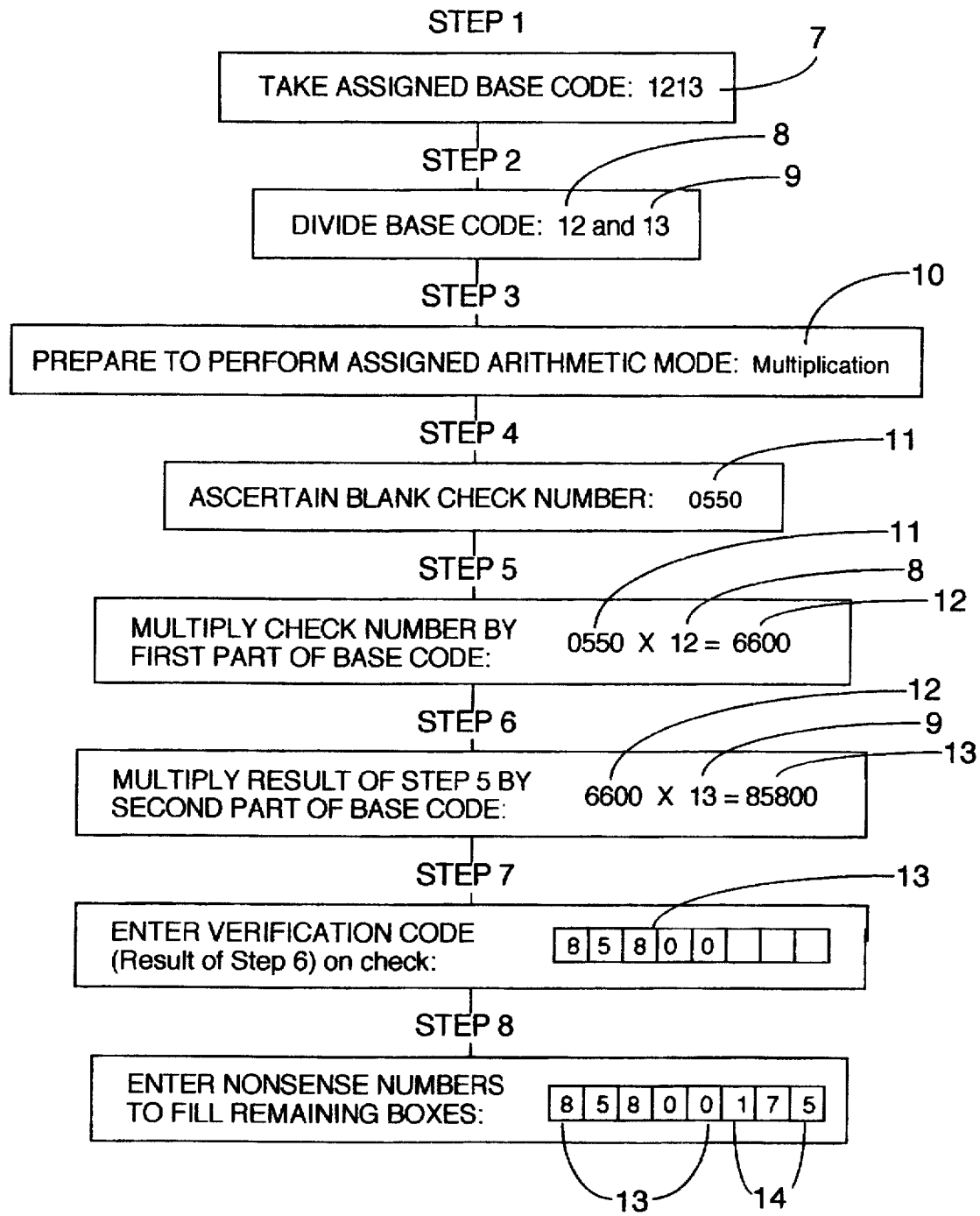
FIG. 2 is a block diagram illustrating the steps taken to determine the verification code for a check transaction.

FIG. 2 provides the steps a check writer would take to utilize the security code system of the present invention. In Step One, the user would start with his assigned base code 7, in this case 1213. In Step Two, he would divide the base code into first part 8, in this case 12, and second part 9, in this case 13. In Step Three, the user would prepare to perform his assigned arithmetic mode, in this case multiplication 10. In Step Four, the user ascertains the blank check number 11, in this case 0550. In Step Five, the user multiplies the check number 11 by the first part 8 of the base code:

0550×12=6600

In Step Six, the result of Step Five, 12, is multiplied by the second part 9 of the base code:

6600×13=85800

In Step Seven, the result of Step Six, 13, 85800, which is the verification code 4 for this transaction, is entered on the check. If any boxes remain empty, they are filled with nonsense numbers 14.

Figure 3:
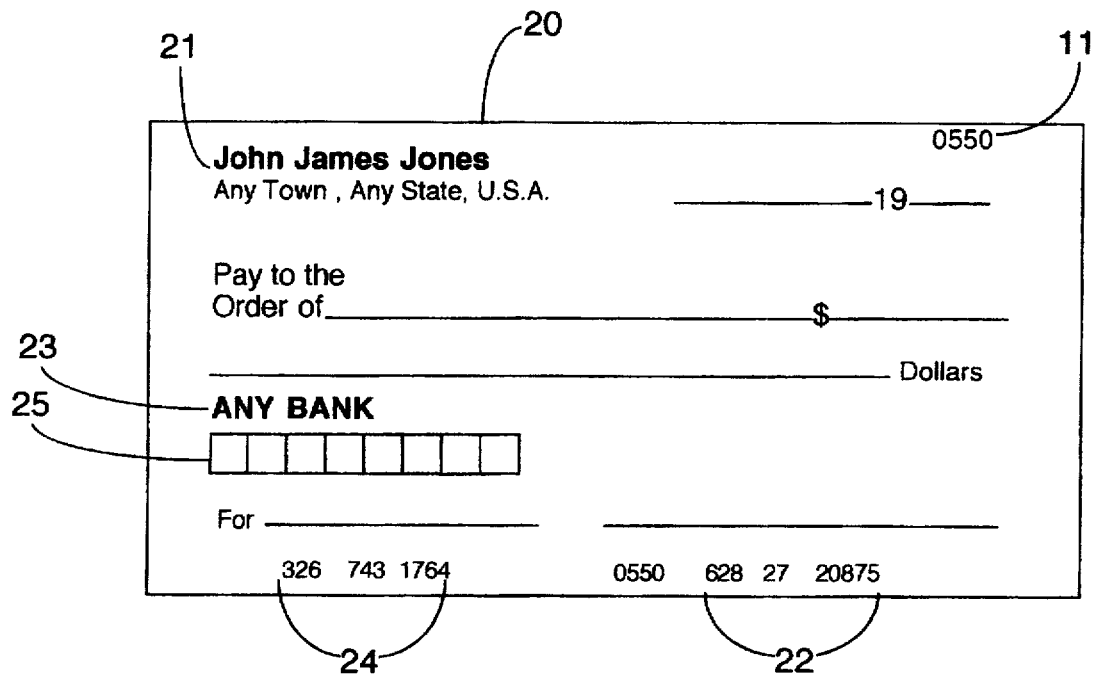
FIG. 3 is a block diagram illustrating the steps taken to determine the verification code for a credit card transaction.

FIG. 3 shows a typical "blank" check 20 for a checking account. The blank check 20 is imprinted with various identifying information, such as the name of the account holder 21, number of the account, 22, and name 23 and number of the bank, 24. The blank check 20 also has spaces to fill in the date, the amount of the check, and the account holder's signature. The blank check 20 shown in FIG. 3 has a check number 11, and has empty verification boxes 25 for entry of the verification code 4.

Figure 4:
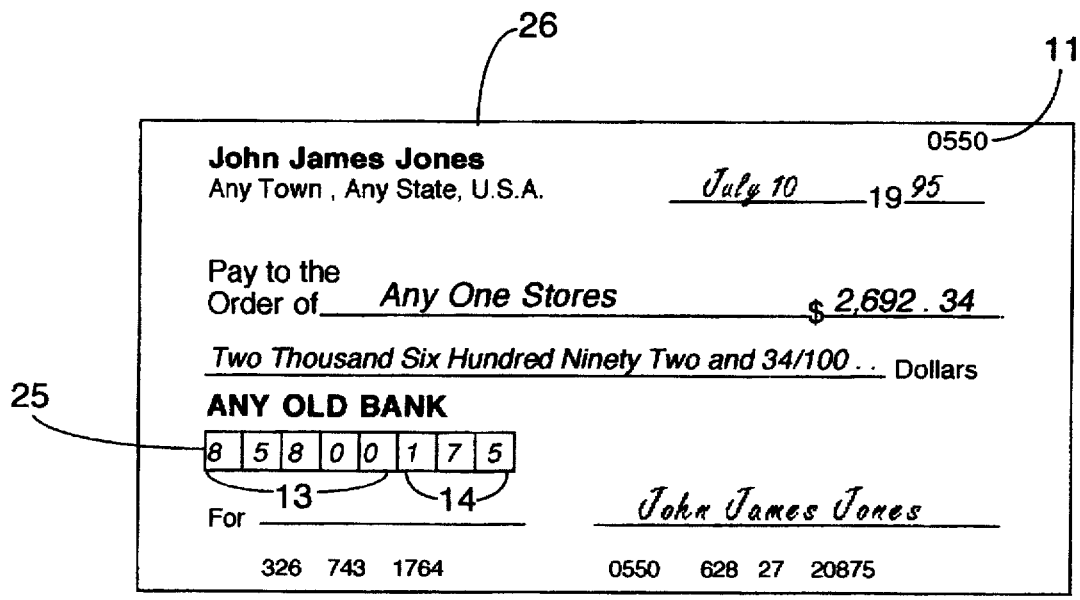
FIG. 4 is a front view of a blank check.

FIG. 4 shows a completed check 26 after it has been filled out by an account holder. This particular example would result from the steps described in FIG. 2, above. The base code 1 is 1213; the arithmetic mode 2 is multiplication; the variable number 3 is the check number 0550; the verification code 4 85800, which has been entered in the first portion of the verification boxes 25 on the check. Nonsense numbers 14 can and have been entered in the remaining verification boxes 25. After presentation, the check is handled as any other check is presently handled. When the check reaches the paying bank, the bank clerk whose job it is to make debit and credit entries to accounts runs the check through a magnetic reader to establish account authenticity. Using a computer keyboard, the clerk enters the date the check is presented, the amount of the check, and the numbers from the verification boxes. The bank's computer compares the numbers to the information it has in storage for the account in order to determine the "correctness" of the verification code. If the numbers are correct, the check is processed. Should the verification code be incorrect, the clerk may decide to compare the signature on the check to that on the signature card, or he may handle the check as a returned item is now handled.

Figure 5:
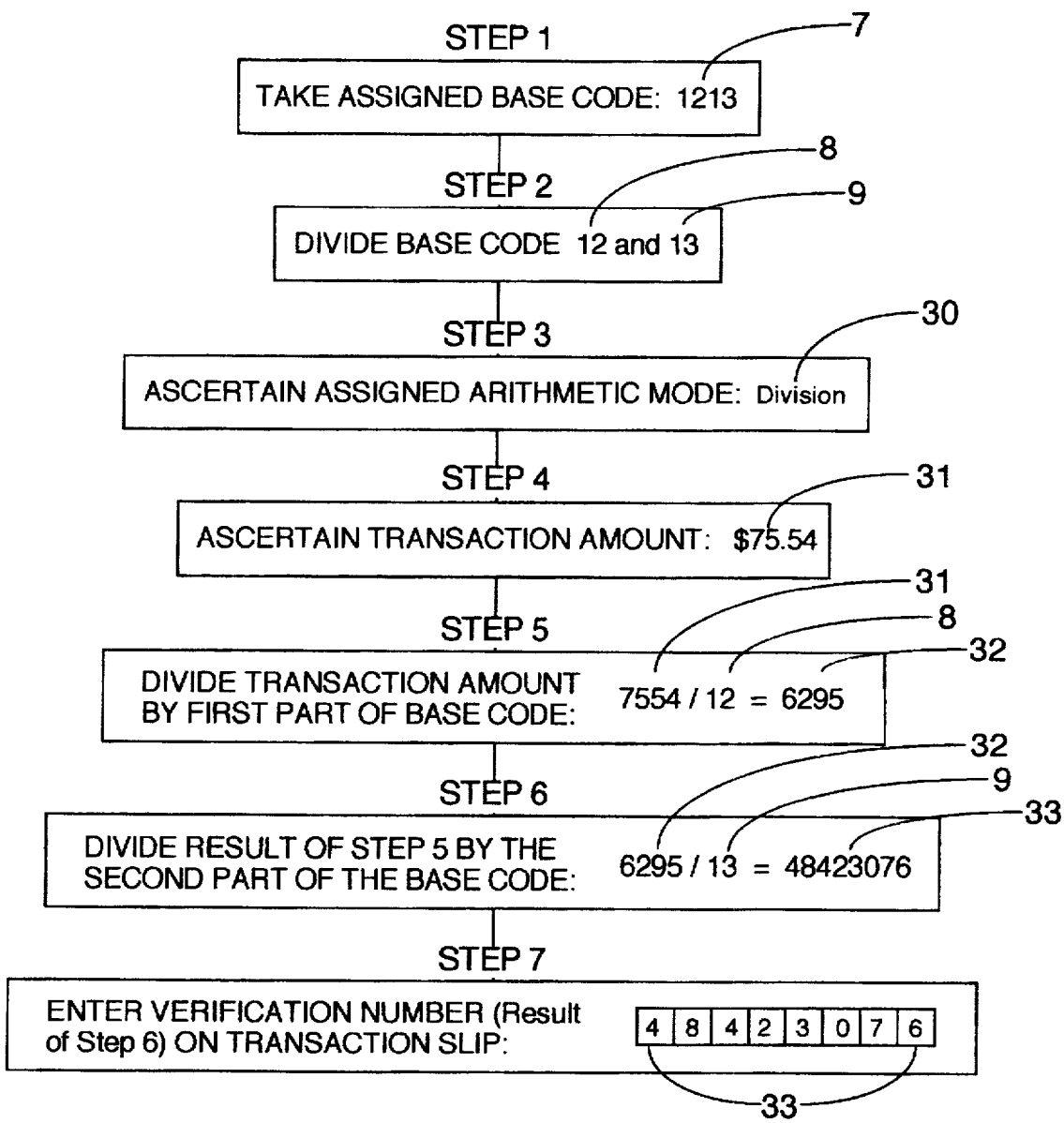
FIG. 5 is a front view of a completed check which incorporates the security code formula of the present invention.

FIG. 5 provides the steps a credit card holder would take to utilize the security code system of the present invention. In Step One, the user would start with his assigned base code 7, in this case 1213. In Step Two, he would divide the base code into first part 8, in this case 12, and second part 9, in this case 13. In Step Three, the user would prepare to perform his assigned arithmetic mode, in this case division 30. In Step Four, the user ascertains the transaction amount 31, in this case $75.54. In Step Five, the user divides the transaction amount 31 by the first part of the base code 8 (If an answer result shows a decimal (it usually will in division) the decimal should be disregarded since it is of no importance):

7554÷12=6295

In Step Six, the result of Step Five 32 is divided by the second part of the base code 9:

6295+13=48423076

In Step Seven, the result of Step Six 33, 48423976, which is the verification code for this transaction, is entered on the transaction slip.

FIG. 6 shows a typical transaction slip 40 for a credit card purchase. The transaction slip 40 is imprinted with spaces to fill in the date, subtotals and totals for the transaction amount, signature line, and space for imprinting information from the credit card being used. The transaction slip 40 has empty verification boxes 25 for entry of the verification code 4.

FIG. 7 shows a completed transaction slip 41 after it has been filled out by the vendor and the credit card holder. This particular example would result from the steps described in FIG. 5, above. The base code 1 is 1213; the arithmetic mode 2 is division; the variable number 3 is the transaction amount 31, $75.54; the resulting verification code 33 is 48423076, which has been entered in the verification boxes 25. The sales clerk can transmit the numbers 48423076 to the central processor immediately for verification of the code. If the credit card issuer does not use immediate verification methods, the code can be verified after the slip is submitted for payment. The issuer will be alerted immediately if an incorrect verification code has been entered, and can notify the cardholder that unauthorized use has taken place.

If a store uses transaction slips that are generated by the cash register, the verification code can still be entered on the slip without the need for preprinted verification boxes.

FIG. 8 shows a "blank" commercial check 50. This type of check includes pension checks and other checks which may be stolen and fraudulently presented. Checks like this are often generated by computer. To take full advantage of the security code system, two rows of verification boxes would be preprinted on the blank checks. The first row 51 would be completed by the check issuer or payor (a company, the government entity, etc.). The second row 52 is completed by the payee, who will have his security code formula on file in the check issuer's bank.

FIG. 9 shows a partially-completed commercial check 53. The base code 1 for the issuer is 1213; the arithmetic mode 2 is multiplication; and the commercial check number 54 is 2967. The issuer has multiplied the commercial check number 54 by the first part 8 of the base code:

2967×12=35604.

He has then multiplied the result by second part 9 of the base code:

35604×13=462852.

The resulting verification code 55 has been entered into the first row 51 of the verification boxes; nonsense numbers 56 complete the entry.

Figure 10:
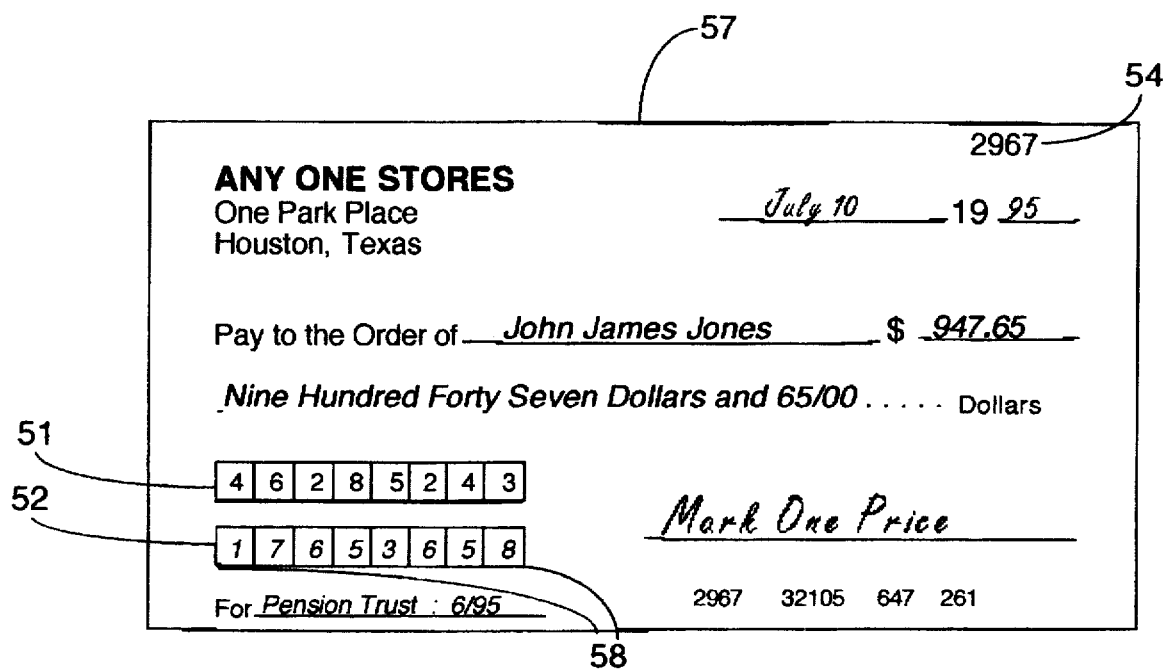
FIG. 10 is a front view of a completed commercial check showing the verification codes of both the maker and the payee.

FIG. 10 shows a completed commercial check 57. The base code 1 for the payee is 3121; the arithmetic mode 2 is division; and the commercial check number 54 is 2967. The payee has divided the commercial check number 54 by the first two digits of the base code:

2967÷31=95709677.

He has then divided the result by the last two digits of the base code (again, the decimal point is dropped):

95709677÷21=45576036

The resulting verification code 58 has been entered into the second row 52 of the verification boxes. After presentation, the checks are handled the same as a regular check, as described above. In addition to verifying the issuer's verification code, a clerk would verify the payee's verification code, comparing it to security code information which would be on file at the issuer's bank.

Figure 11:
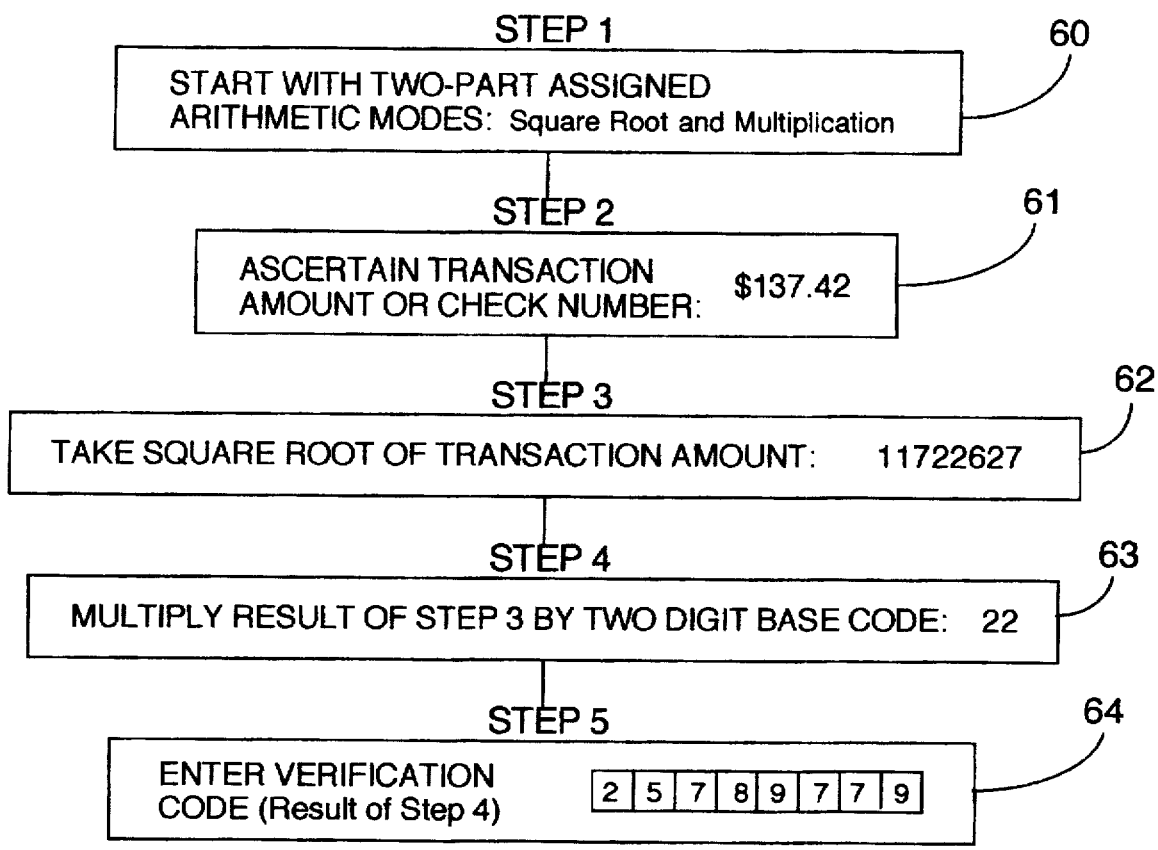
FIG. 11 is a block diagram illustrating the steps taken to determine the verification code when the square root function is used as an arithmetic mode.

When a two-digit base code is assigned, the security code system works best when the arithmetic modes utilized are square root followed by multiplication or division. FIG. 11 shows how the verification code would be found. In Step 1, the user would be assigned two arithmetic modes 60, here square root and multiplication. In Step 2, the user would ascertain the transaction amount 61 or check number, here $137.42. The user would take the square root 62 of $137.42, with 11722627 as the result. He would then multiply the result of Step 3 by his assigned two-digited base code 63, which is 22:

11722627×22=25789779

The resulting verification code 64, 25789779 is entered on the transaction slip.

I claim:

1. A method of verifying that a credit card transaction is being completed by an authorized user of a credit card, comprising the steps of:

a. issuing a credit card to a credit card holder with an account;

b. assigning a security code formula to said credit card holder's account and making said formula known to said credit card holder, said formula consisting of two variables, namely:

(1) a constant, multiple-digit numerical base code, said base code being separated into a first part and a second part;

(2) one or more arithmetic modes;

c. upon presentation of said credit card for payment of a transaction, having said credit card holder be informed of a total transaction amount;

d. requiring said credit card holder to calculate a verification code number which is a mathematical result of performing said arithmetic mode upon the transaction amount and the first part of said base code, and then performing said arithmetic mode or a second arithmetic mode upon the result and the second part of said base code;

e. requiring said credit card holder to inscribe said verification code number on a transaction slip and to inscribe any single-digit number or numbers to complete an eight-digit entry;

f. verifying said verification code number by comparing it to the verification code number which would be produced by said security code formula for said account.

2. A method as defined in claim 1, wherein the two variables involved in assigning the security code formula in step b are further defined, so that:

(1) said multiple-digit numerical base code is selected from among numbers containing at least two digits and no more than eight digits; and (2) said arithmetic modes are selected from multiplication, division, or square root.

3. A method of verifying that a check is being completed by an authorized signatory on an account, comprising the steps of:

a. opening a checking account and issuing checks to an account holder;

b. assigning a security code formula to said account and making said formula known to said account holder, said formula consisting of two variables, namely:

(1) a constant, multiple-digit numerical base code, said base code being separated into a first part and a second part; and (2) one or more arithmetic modes c. upon completion of a check, having the account holder ascertain a check number;

d. requiring said account holder to calculate a verification code number, which is a mathematical result of performing said arithmetic mode upon the check number and the first part of said base code, and then performing said arithmetic mode or the second arithmetic mode upon the result and the second part of said base code;

e. requiring said account holder to inscribe said verification code number on said check and to inscribe any single-digit number or numbers to complete an eight-digit entry;

f. upon presentation of said check for payment, verifying said verification code number by comparing it to the verification code number which would be produced by said security code formula for said account.

4. A method as defined in claim 3, wherein the two variables involved in assigning a security code formula in step b are further defined, so that:

(1) said multiple-digit numerical base code is selected from among numbers containing at least two digits and no more than eight digits; and (2) said arithmetic modes are selected from multiplication, division, or square root.

5. A method of verifying that a commercial check is being completed by both an authorized payor of said commercial check and an authorized payee of said commercial check, comprising the steps of:

a. issuing commercial checks to a payor;

b. assigning a different security code formula to each of said commercial check payor and each payee and making each assigned security code formula known to the commercial check payer and the payee, each said formula consisting of two variables, namely:

(1) a constant, multiple-digit numerical base code, said base code being separated into a first part and a second part; and (2) one or more arithmetic modes;

c. upon completion of said commercial check, having said payor ascertain a check number;

d. requiring said payor to calculate a payor verification code number, which is a mathematical result of performing said arithmetic mode upon the check number and the first part of payor's said base code, and then performing said arithmetic mode or the second arithmetic mode upon the second part of said base code;

e. requiring said payor to inscribe said payor's verification code number on a payor verification line on said commercial check and to inscribe any single-digit number or numbers to complete an eight-digit entry;

f. upon receipt of said commercial check, requiring said payee to calculate a payee verification code number, which is a mathematical result of performing said arithmetic mode upon the check number and the first part of payee's said base code, and then performing said arithmetic mode or the second arithmetic mode upon the result and the second part of said base code.

g. requiring said payee to inscribe said payee's verification code number on a payee verification line on said commercial check and to inscribe any single-digit number or numbers to complete an eight-digit entry;

h. upon presentation of said commercial check for payment, verifying said payor verification code number and said payee verification code number by comparing each to the verification code numbers which would be produced by each of said security code formulas for said payor and for said payee.

6. A method as defined in claim 5, wherein the four variables involved in assigning each security code formula in step b are further defined, so that:

(1) said multiple-digit numerical base code is selected from among numbers containing at least two digits and no more than eight digits; and (2) said arithmetic mode is selected from multiplication, division or square root.

7. A method of verifying a financial transaction is being completed by an authorized person, comprising the steps of:

a. having an account with an account-holder;

b. assigning a security code formula to said account and making said formula known to said account-holder, said formula consisting of two variables, namely:

(1) a constant, multiple-digit numerical base code; and (2) square root as a first arithmetic mode, and a second arithmetic mode c. requiring said account holder to calculate a verification code number, which is a mathematical result of taking the square root of a variable number, and then performing said second arithmetic mode upon the result and said numerical base code;

d. requiring said account holder to inscribe said verification code number on a transaction document and to inscribe any single-digit number or numbers to complete an eight-digit entry;

e. verifying said verification code number by comparing it to the verification code number which would be produced by said security code formula for said account.

8. A method as defined in claim 7, wherein the two variables involved in assigning the security code formula in step b are further defined, so that:

(1) said multiple-digit numerical base code is selected from among numbers containing at least two digits and no more than eight digits; and (2) said second arithmetic mode is selected from multiplication, division, or square root, and wherein the variable number described in part c is either a check number or a transaction amount number.

9. A method of verifying that a transaction is being completed by an authorized person, comprising the steps of:

a. opening an account with an account user;

b. assigning a security code formula to said account and making said formula known to said account user, said formula consisting of two variables, namely:

(1) a constant, multiple-digit numerical base code, said base code being separated into a first part and a second part; and (2) one or more arithmetic modes;

c. upon request for verification of said account users identity, informing said account user of a specific number;

d. requiring said account user to calculate a verification code number, which is a mathematical result of performing said arithmetic mode upon said specific number and the first part of said base code, and then performing said arithmetic mode or the second arithmetic mode upon the result and the second part of said base code;

e. requiring said account user to repeat said verification code number;

f. verifying said verification code number by comparing it to the verification code number which would be produced by said security code formula for said account.

10. A method as defined in claim 9, wherein the two variables involved in assigning a security code formula in step b are further defined, so that:

(1) said multiple-digit numerical base code is selected from among numbers containing at least two digits and no more than eight digits; and (2) said arithmetic modes are selected from multiplication, division, or square root.

* * * * *